O. J. MOURNING.
GRIDDLE OILING AND CLEANING DEVICE.
APPLICATION FILED AUG. 11, 1919.

1,321,387.

Patented Nov. 11, 1919.

INVENTOR
Oliver J. Mourning
BY
U. G. Charles
ATTORNEY

UNITED STATES PATENT OFFICE.

OLIVER J. MOURNING, OF WICHITA, KANSAS.

GRIDDLE OILING AND CLEANING DEVICE.

1,321,387.  Specification of Letters Patent.  Patented Nov. 11, 1919.

Application filed August 11, 1919. Serial No. 316,766.

*To all whom it may concern:*

Be it known that I, OLIVER J. MOURNING, a citizen of the United States of America, and resident of Wichita, in the county of Sedgwick and State of Kansas, have invented certain new and useful Improvements in Griddle Oiling and Cleaning Devices, of which the following is a specification, reference being had to the appended drawings.

My invention relates to devices for applying grease, oil or fat to culinary griddles and pans; also for cleaning such utensils of carbon, etc.

The objects of the invention are to provide a device of this kind which is most convenient to fill and to operate, and of very simple construction, eliminating (for example) all feeder tubes and springs.

Briefly described, the preferred construction comprises a sheet-metal base having spaces for the upper edges of a felt pad, also for the oil or lard receptacle; a handle mounted on said base; a thick pad of felt or other absorbent material held upon the bottom of the base, and a pair of sheet-metal serrated jaws hingedly mounted on said base and adapted to hold the pad in position without springs or set-screws.

The invention will be better understood from reference to the accompanying sheet of drawings, in which—

Figure 1:
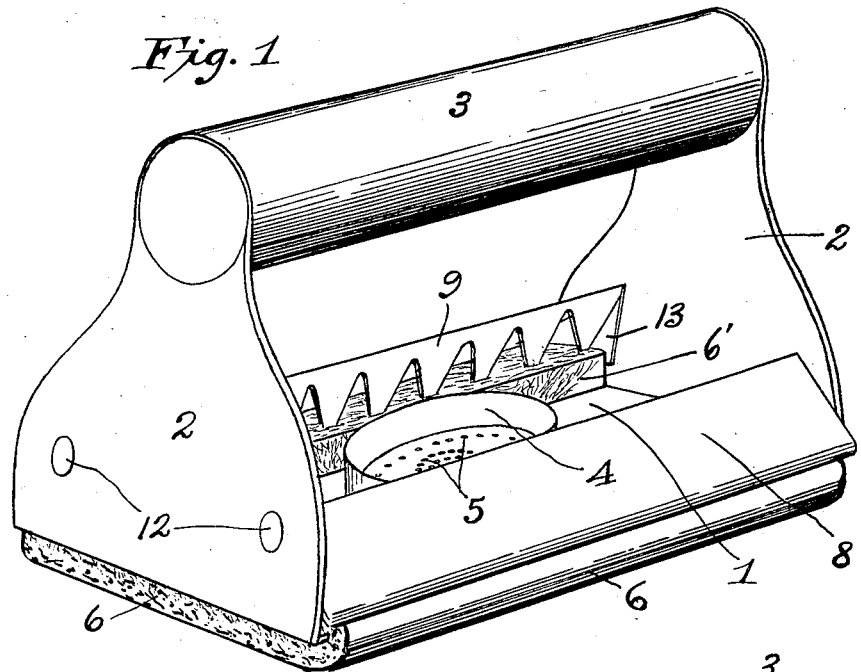
Figure 2:
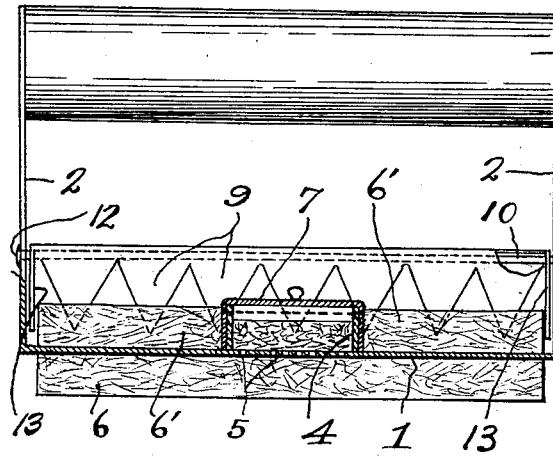
Figure 3:
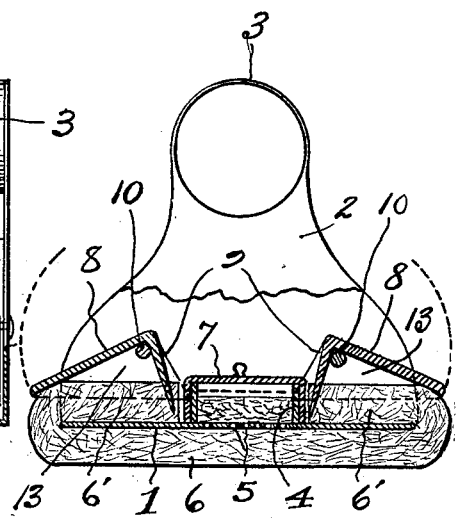

Figure 1 is a perspective of the device, omitting the lid of the receptacle. Fig. 2 is a vertical longitudinal section with certain parts in elevation and the cup-lid in place. Fig. 3 is a vertical cross-section of the device, the handle and one end-piece being in elevation.

The base of the device is a flat sheet-metal plate 1, rectangular in outline, and having at each end thereof an integral upstanding portion 2, hereafter termed a cheek.

The handle, 3, is a tube of sheet-metal and its ends are secured to the cheeks 2 in any suitable manner.

The receptacle for the grease, oil or fat is a sheet-metal cup 4, consisting only of a wall 4 and having no bottom except the portion of the base 1 upon which it is mounted. Said receptacle is soldered or otherwise secured to the central portion of the base, which has perforations 5 whose function is to admit oil or melted fat into the pad 6. The cup 4 is provided with a lid 7, the purpose of which is to prevent oil from splashing out when the device is in use.

The pad 6 is made of felt or any preferred material and should be about ⅜ inch in thickness. It is dimensioned to cover the entire surface of the base 1, and has extended portions 6' adapted to overlie the lateral portions of said base as shown on Fig. 3.

These portions 6' of the pad may be held removably in position by any means that may suggest themselves to a mechanic. The means which I think best for the purpose consist of a pair of jaws 8 having teeth 9, and pivotally mounted on rods 10 which extend parallel to the base 1 and have their ends riveted to the cheeks 2, as shown on Fig. 2, the heads being marked 12.

Each jaw 8 comprises the longitudinal portions 8—9 and a triangular ear 13 bent at right angle on each end thereof. Ears 13 are perforated to receive the rods 10, being thus pivotally mounted on said rods. Portion 8 of each jaw is integral with the toothed portion 9, which is bent at right angle to portion 8 and is formed with a row of large sharp pointed teeth 9, which are of a length to penetrate the pad edges 6' deeply. The jaw portions 8 provide handles by which the operator can turn the jaws; the loci of the outer edges being shown in dotted arcs on Fig. 3. The jaws, when set in the position shown in this figure, will maintain such position without the use of springs or catches, as a working model shows.

When desired to remove the pad 6, the parts 8 are turned up far enough to carry the teeth 9 clear of the pad-portions 6'.

To prepare the device for use, the entire pad 6 may be dipped in oil or melted lard. But whether this be done or not, the cup 4 is filled with the grease, oil or fat to be used and the lid 7 replaced. If the pad is dry it is heated to cause the fat or grease to melt in the cup and cause it to be absorbed by the pad through the perforations 5.

The mode of using the device needs no description.

Having now described the invention, I claim as new, and desire to secure by Letters Patent:

In a device of the kind described, a flat base-plate provided with integral upturned end-portions, a grease-cup mounted directly upon the center of said base-plate, said cup being of small dimensions comparative to said plate; a pad of absorbent material covering the lower surface of said plate and having integral portions overlapping opposite sides of the top of said plate; pivot-rods supported by said end portions and parallel to said plate; a pair of jaws rockably mounted on said rods respectively, each jaw being provided with a series of teeth adapted to engage one of said overlapping end-portions and to hold the pad with pressure against said base-plate.

(Signed.) OLIVER J. MOURNING.

Witnesses:
W. A. NETHERCOT,
NELLIE D. WILBUR.

Copies of this patent may be obtained for five cents each, by addressing the "Commissioner of Patents, Washington, D. C."